June 1, 1937.　　　C. G. WALL　　　2,082,529
VALVE DEVICE
Original Filed July 18, 1936　　2 Sheets-Sheet 1
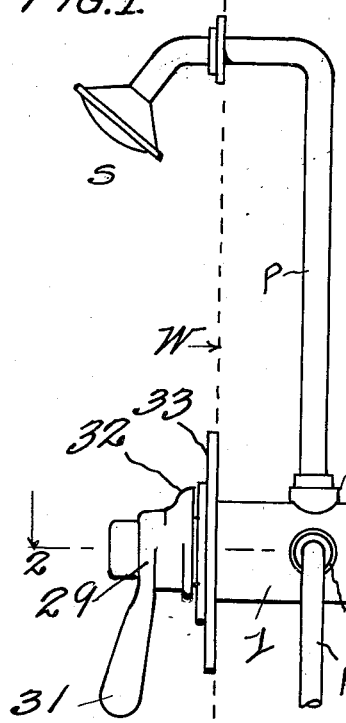
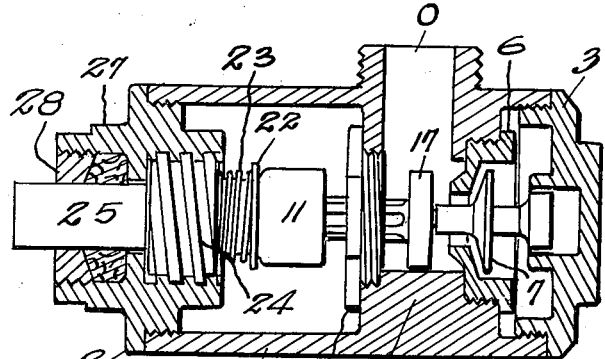
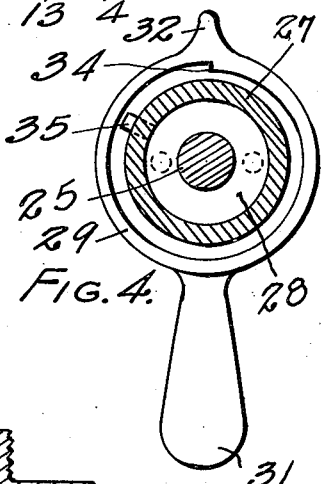
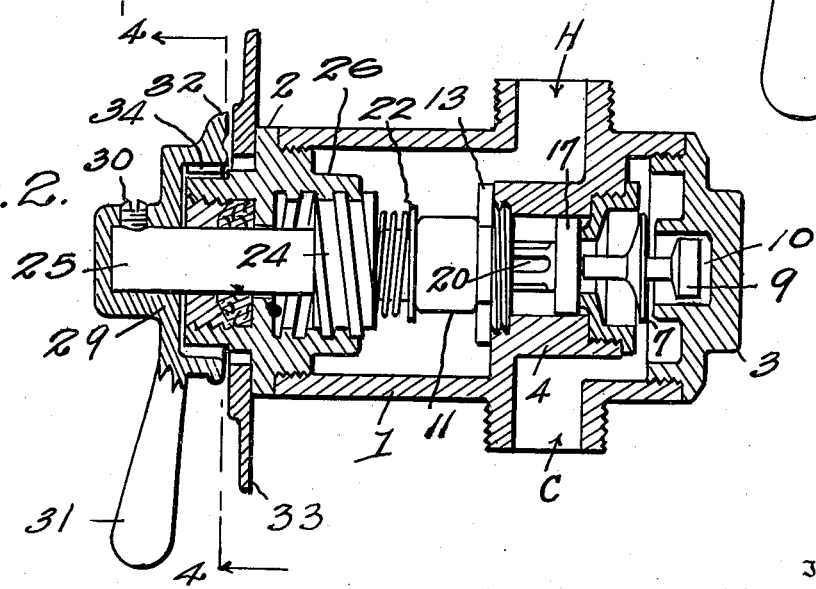
Inventor
CHARLES G. WALL
By Thomas R. Harney
Attorney

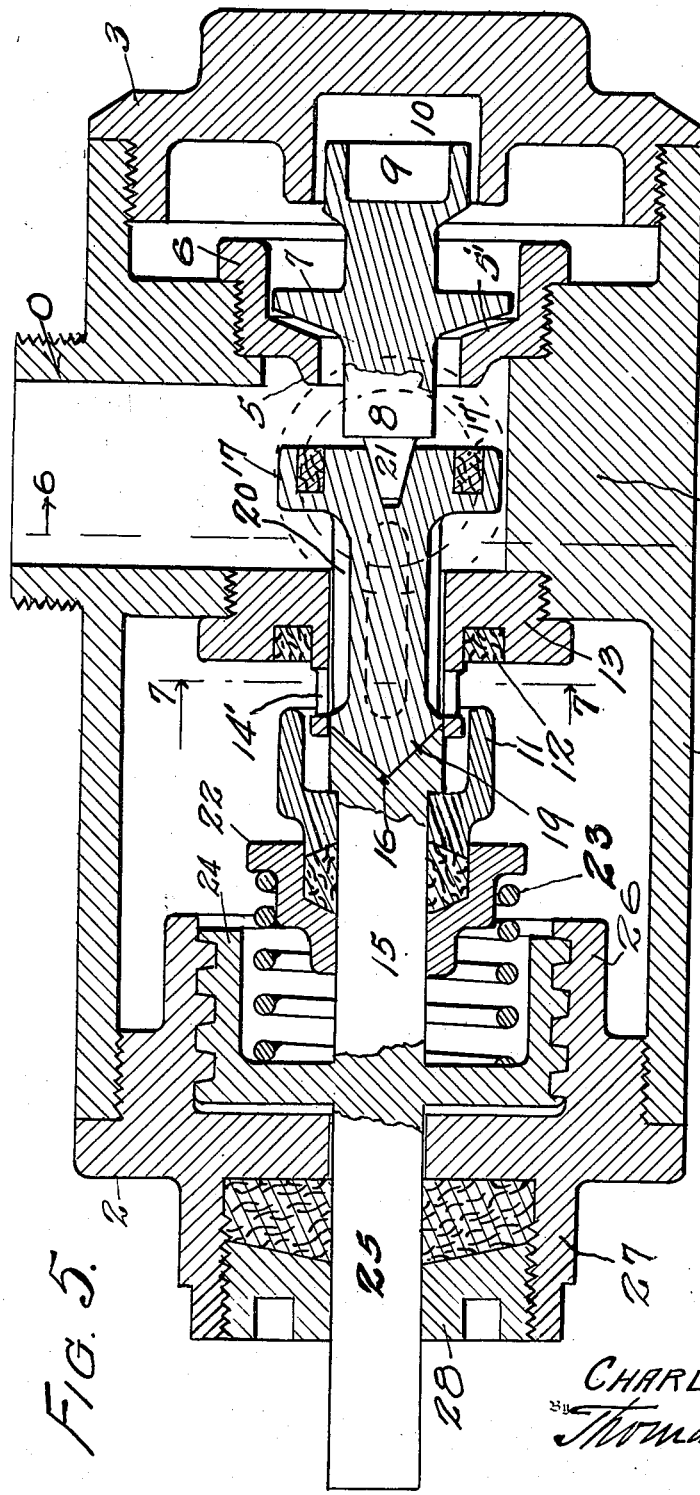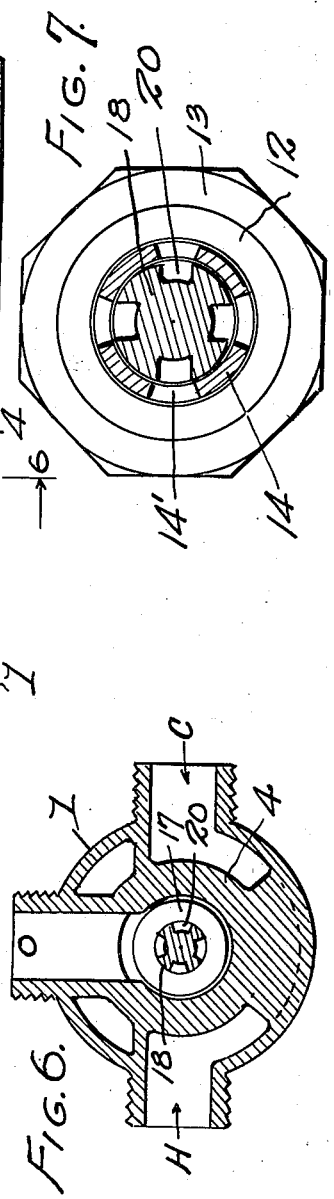

Patented June 1, 1937

2,082,529

REISSUED

UNITED STATES PATENT OFFICE 2,082,529

VALVE DEVICE

Charles G. Wall, Philadelphia, Pa.

Application July 18, 1936, Serial No. 91,415
Renewed April 19, 1937

8 Claims. (Cl. 277—18)

My present invention relates to an improved valve device for the mixture of hot and cold water, or other liquids, and while the device of my invention may be utilized in connection with baths, faucets, lavatories, and similar fixtures, it is especially designed and herein described and illustrated for use in connection with a shower-bath fixture or appliance.

In carrying out my invention I employ two axially alined rotary, and longitudinally movable valves for mixing the hot and cold water within a suitable casing, which valves are under control of a single operating handle or hand lever, and one of the valves, in addition to its function of controlling the entrance of cold water, operates in the nature of a floating device to automatically shut off the hot water in an emergency, and to assist in supplying the hot water for mixture with the cold water when both the hot water and the cold water valves are open for that purpose.

The invention consists in certain novel combinations and arrangements of parts as will hereinafter be more fully set forth and claimed. In the accompanying drawings I have illustrated one complete example of the physical embodiment of my invention, wherein the parts are combined and arranged according to one mode I have thus far devised for the practical application of the principles of my invention. It will be understood, however, that changes and alterations are contemplated and may be made in the exemplifying drawings, within the scope of my appended claims, without departing from the principles of the invention.

Figure 1 is a view in elevation showing the device of my invention used in connection with a shower-bath appliance, the parts being indicated as concealed within a wall or panel.

Figure 2 is a longitudinal, horizontal, sectional view, enlarged, as at line 2—2 of Figure 1, with the hot and cold water valves in closed position.

Figure 3 is a vertical longitudinal view of the device, with the hot and cold water valves in open position for mixing the hot and cold water.

Figure 4 is a transverse sectional view at line 4—4 of Figure 1, showing the means for limiting the turning movement of the operating handle or hand-lever of the valves.

Figure 5 is a sectional view similar to Figure 3, but enlarged to illustrate in section the details of construction of some of the interior parts of the device.

Figure 6 is a transverse sectional view at line 6—6 of Figure 5 (but on the scale of Figures 2 and 3) showing the hot and cold water inlets, and the hot water outlet.

Figure 7 is a transverse sectional, detail view, at line 7—7 of Figure 5, showing the hot water ports in section and a face view of the hot water valve-seat, together with the slotted piston of the floating control device.

In the assembly view of Figure 1 a typical shower-head is indicated at S, as projecting from a panel or wall W indicated in dotted lines, and a supply pipe P concealed within the wall is connected at its lower end to the outlet O of the cylindrical casing 1 of the mixing valve device, which is also concealed and suitably mounted in the wall W. A cold water pipe P' is shown as connected with the cold water inlet C, and a similar pipe (not shown) is connected to hot water inlet H, the openings O, H, and C, as indicated in Figure 6, being in the same vertical plane passing through the cylindrical casing.

The opposite open ends of the casing are fashioned with interior threads for the reception of the front cover or cap 2 and the inner or rear cover or cap 3, respectively, which close the casing, and an intermediate cylindrical longitudinally extending wall 4, concentrically arranged, is fashioned within the cylinder or casing 1 at the plane of the two inlets and the outlet of the casing. In the drawings, the cold water stream enters at C and passes toward the right end of the casing, then enters the cylinder 4 at its right end and flows upwardly through outlet O. The hot water enters at H and passes toward the left end of the cylinder 4, and then, after entering the left end of the mixing cylinder 4, passes upwardly, and is mixed with the cold as it emerges through outlet O, so that the temperature of the water flowing through the supply pipe P and the shower head S may be controlled as desired.

The cold water unit includes a valve seat 5, open at the center and projecting inwardly at the rear or right end of the mixing cylinder, and this reduced annular seat is integral with a cup-shaped nut 6, threaded into the end of the mixing cylinder, and fashioned at its right or rear side with a tapered annular seat 5' forming the bottom of the depressed or recessed, open-center nut. Within the cup-shaped nut is mounted a circular disk 7, which forms a cold-water pressure head, and the disk which is integral with and disposed transversely of a solid cylindrical plunger 8, is adapted to reciprocate, longitudinally, in the cupped nut, and control the flow of cold water through the open valve seat 5, from the right end of the casing 1 to the mixing cylinder.

To guide the plunger 8 in its reciprocating movement, and also to add surface area for use with the pressure head or disk 7, the rear end of the plunger is fashioned with a slightly enlarged cupped-head 9 that is located in a pressure chamber 10 of the casing head or cover 3. The cupped head 9 fits loosely in the wall of the chamber so that cold water, under pressure, may flow around, or by-pass around the cupped-head into the chamber, thus supplying an auxiliary pressure in addition to the cold water pressure against the disk 7, for urging the plunger toward its seat 5'.

The hot water valve 11, located between the front cover or casing head 2 and the mixing cylinder 4, is fashioned as a hollow or tubular, circular head that is adapted to close against a packing ring 12 (forming a valve-seat) which is inserted in a face-groove of the threaded and flanged holder 13 which is screwed into a complementary hole or open end of the mixing cylinder 4. The cup shaped nut 6 and the holder 13 thus close the opposite ends of the mixing chamber, the nut 6 having the cold water valve-seat 5 within the mixing chamber, and the holder 13 providing the hot water valve-seat 12 exterior of the mixing chamber and in the hot water compartment of the cylindrical casing 1. As best seen in Figures 5 and 7, the seat holder 13 is fashioned with a central bushing 14 forming an extension of the central bore of the holder, and of less diameter than the inner periphery of the valve seat 12, and this projecting bushing, which is provided with radial ports as 14', terminates at its free end within the tubular valve-head 11. Thus the tubular valve head is adapted to reciprocate, longitudinally, of the ported bushing, from the closed position of Figure 2 where the valve head impinges with the seat 12, to the open position of Figures 3 and 5 where the hot water valve is open.

In Figure 5 it will be seen that the tubular valve head 11 is mounted on an auxiliary stem 15 extending longitudinally at the center of the valve casing 1, and this stem is fashioned with a slightly enlarged socket head 16 adapted to reciprocate in the bushing 14 of the holder 13.

The cold water valve for co-action with the valve seat 5 is fashioned as a piston head 17 having a packing ring 17' and the piston head is integral with a "floating" piston 18 having a bearing head 19 complementary to and adapted to seat in the socket head 16 of the auxiliary stem. This piston extends through the bore of the holder 13 and through its ported bushing, with the piston head or cold water valve in the mixing cylinder, and the piston is provided with exterior longitudinally extending grooves 20 through which the hot water may flow when valve 11 is open, from the hot water side of the casing 1 into the mixing cylinder or chamber 4. The floating piston is axially alined with and located between the auxiliary stem 15 and the cold water plunger 8, and the latter is fashioned with a guide pin 21 for engagement in a socket at the center of the piston head or valve 17.

In the open position of the valves in Figure 5, cold water pressure against the cupped-head 9 and the pressure disk 7, holds the plunger against the floating piston, and cold water is flowing around the disk or pressure head 7, through the open valve seat 5 into the mixing cylinder. From the hot water side of the mixing cylinder, hot water is flowing through ports 14' and grooves 20, into the mixing cylinder or chamber, and the mingling streams flow upwardly through the outlet O to the supply pipe P.

The hot water valve 11 is held against the shoulder of the socket head 16 of the auxiliary stem 15 through the instrumentality of a flanged spring-collar 22 mounted on the stem and provided with a packed joint between the tubular valve head and the collar. A valve spring 23 is interposed between the spring collar 22 and the transverse wall of a worm cup 24 which is rigid with, or integral with the auxiliary stem 15, the interior diameter of the cup being ample to receive the spring and the collar, and the collar being spaced from the transverse wall of the cup to hold the spring under compression.

The worm cup as indicated is fashioned with quick-acting screw threads, and it may be fashioned integral with, or rigid with the main stem 25 of the valve device, it being understood that the main stem 25, the worm cup 24 and the auxiliary stem 15 are secured together in suitable manner so that they revolve or rotate when the main stem is turned.

The rotary unit including the main stem, the worm cup or screw head and the auxiliary stem, are turned to project the two valves 12 and 17 to closed position, and to retract the hot water valve from closed position, as the stem 25 is turned to also turn the worm cup or screw head 24 in an interiorly threaded annular flange 26 of the outer head or cover 2 of the cylindrical casing. The head or cover 2 is also provided with an exterior flange 27, a packing nut 28 and a gasket or gland, surrounding the rotary valve stem 25 to prevent leakage of water through the open center of the cover or head 2.

The valve stem is turned through the instrumentality of a hollow, cylindrical head 29, rigidly secured on the projecting outer end of the stem 25, as by a set screw 30, and the head is fashioned with a usual operating handle or hand lever 31 which is readily accessible to the bather for controlling the flow of water. A pointer 32 is provided on the operating head for usual co-action with hot and cold water marks on the dial plate or wall plate 33 which is mounted on the head or cover 2 of the valve casing, and any suitable means may be employed for limiting the turning movement of the hand lever, as for instance an interior lug or shoulder 34 on the operating head, and a stop pin 35 located in suitable position and fixed to the flange 27 of the head 2 of the valve casing.

As the hand lever is turned to close the valves, it will be noted that the hot water valve, traveling a shorter distance than the cold water valve, is seated in advance of the seating of cold water valve 17 against its seat 5. It will also be noted that from closed position turning the handle to open the valve first enforces a full stream of cold water before hot water is permitted to enter the mixing cylinder or chamber.

Inasmuch as the pressure disk 7 and the cup-disk 9 provide a cold water area subject to pressure, greater than the area of pressure against the piston head 17, it will be apparent that the cold water valve 17 is backed from its seat 5 under cold water pressure, when the handle 31 is turned to open the valves, and the cold water valve is thus opened by cold water pressure.

Should the cold water pressure, for any reason fail to open the cold water valve, or fail to hold it in open position, an excessively hot, or scalding discharge from outlet O is prevented, by the automatic operation of the floating piston, the head 17 of which forms the cold water valve. Thus, in the event of failure of the cold water pressure, the hot water pressure through ports 14' and grooves 20 will impinge against the front face of the piston head 17 and move the floating piston to the right in Figure 5. This movement carries the grooves 20 away from their open communication with ports 14', thereby cutting off flow of hot water through the grooves and excluding the hot water from the mixing cylinder or chamber 4. When the cold water pressure is again established, the piston head 17 is moved to open the cold water valve seat 5 for flow of cold water, and the grooves 20 again communicate with the hot water ports 14', thereby admitting both cold water and hot water to the cylinder 4.

The cold water valve seat 5 is closed by the valve 17 due to the direct thrust of the rotary stem 15 against the floating piston, while the hot water valve 11 is closed against its seat 12 under tension of the spring 23, which is compressed by the longitudinal movement of the worm cup 24, and continued longitudinal movement of the stem 15 is permitted after the hot water valve is closed.

A full water stream, of cold water, may be had by turning the hand lever, up to the point at which the head 16 of the stem 15 comes to rest against the tubular or hollow hot water valve 11, after which continued movement of the stem results in withdrawal of the hot water valve 11 from its seat 12, thereby admitting hot water to the mixing chamber for mingling with the cold water stream.

Having thus fully described my invention, what I claim as new and desire to secure by Letters Patent is:—

1. In a water-mixing valve-device the combination with a casing having an interior mixing chamber and a cold water valve seat opening into the chamber at one end, and an open-center holder at the other end of the chamber having a valve seat exterior of the chamber, of a floating piston mounted in the holder having a head forming a valve adapted to close the cold water seat, means operative under cold water pressure to unseat the cold water valve, a longitudinally movable stem and a valve thereon to close the exterior valve seat, and said piston having means for communication between the mixing chamber and the hot water side of the casing.

2. In a water-mixing valve-device, the combination with a casing having an interior mixing chamber, a cold water valve seat in one end of the chamber, and an open center holder closing the other end of the chamber, said holder having a valve-seat and a hot water valve for said seat, and a ported bushing on the holder, of a ported piston movable in the holder, a piston head within the chamber adapted to close the cold water valve seat, and means operative under cold water pressure to unseat said piston head.

3. In a valve device having an interior mixing chamber, a cold water valve seat in one end of the chamber, an open-center holder closing the other end of the chamber and provided with a valve seat, and a hot water valve for the latter valve-seat, of a ported piston movable in said holder for co-action with the hot water valve, a piston head on the piston adapted to close the cold water valve seat, a longitudinally movable stem at one end of the piston, and a cold-water pressure-operated plunger mounted in the cold water valve seat adapted to unseat the piston head.

4. In a valve device having an interior mixing chamber, the combination with a longitudinally movable stem having a hot water valve exterior of one end of the chamber, a cold-water valve seat opening into the chamber and mounted in the other end of the chamber, a holder having an open center and mounted in the hot water side of the chamber and a seat in said holder for the hot water valve, of a floating piston mounted in the holder with one end abutting the stem, a ported bushing on the holder adapted to be overlapped by the hot water valve and adapted to co-act with ports in the piston, a piston-head in the chamber adapted to close the cold water valve, and a cold-water pressure operated plunger alined with the piston and adapted to unseat the latter from the cold water valve.

5. The combination with a casing having a cold water inlet, a hot water inlet, and an outlet in a single transverse plane, and an interior spaced wall forming a mixing chamber within the casing, of a cold water valve and a hot water valve controlling openings into said chamber, mechanically operated means for opening the hot water valve, and cold-water pressure-operated means for opening the cold water valve.

6. In a water mixing valve device, the combination with an open-center holder having a ported bushing and an annular seat, of a reciprocable stem having a head, an annular valve head mounted on the stem adapted to enclose the ported bushing and engage said seat, a spring adapted to hold said valve against said head, and means for reciprocating the stem.

7. In a water mixing valve device, the combination with an open center holder having a ported bushing at one side, a grooved floating piston mounted in said holder and having a piston head at the other side of the holder, of a reciprocable stem having a head for engagement with and alined with said piston, and a spring-pressed annular valve-head mounted on the stem, said valve head being adapted to engage the stem-head, and also adapted to enclose the ported bushing and engage the valve seat.

8. In a water-mixing valve-device the combination with a casing having a threaded annular flange, of a rotary stem having a complementary, hollow, head mounted in said flange, an auxiliary stem alined with and rigid with the first stem and a head on the auxiliary stem, an annular valve-head mounted on the auxiliary stem and a spring interposed between the valve head and the hollow threaded stem, a stationary holder and a valve seat therein, and said holder having a central ported bushing adapted to be enclosed by the valve head when the latter engages its seat.

CHARLES G. WALL.